H. C. STANBRIDGE.
LIFTING JACK.
APPLICATION FILED JUNE 9, 1915.

1,184,145.

Patented May 23, 1916.

Inventor
H. C. STANBRIDGE
By Watson E. Coleman
Attorney

UNITED STATES PATENT OFFICE.

HIRAM C. STANBRIDGE, OF NEW BEDFORD, MASSACHUSETTS.

LIFTING-JACK.

1,184,145.  Specification of Letters Patent.  Patented May 23, 1916.

Application filed June 9, 1915. Serial No. 33,161.

*To all whom it may concern:*

Be it known that I, HIRAM C. STANBRIDGE, a citizen of the United States, residing at New Bedford, in the county of Bristol and State of Massachusetts, have invented certain new and useful Improvements in Lifting-Jacks, of which the following is a specification, reference being had to the accompanying drawings.

This invention comprehends certain new and useful improvements in lifting jacks, and relates particularly to a jack designed for use in connection with automobiles or other vehicles, although the invention is not limited in this regard.

The invention has for its primary object a durable and efficient construction of device of this character, the parts of which may be easily manufactured and readily assembled and not liable to get out of order, and which may be very easily manipulated to raise the axle of the vehicle when required and to hold the same at the desired height, while a tire is changed or other work done upon the vehicle, or for use as a permanent stand when it is desired to support the vehicle in an elevated position where its weight will not be imposed upon the pneumatic tires. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter more fully describe and claim.

Figure 1:
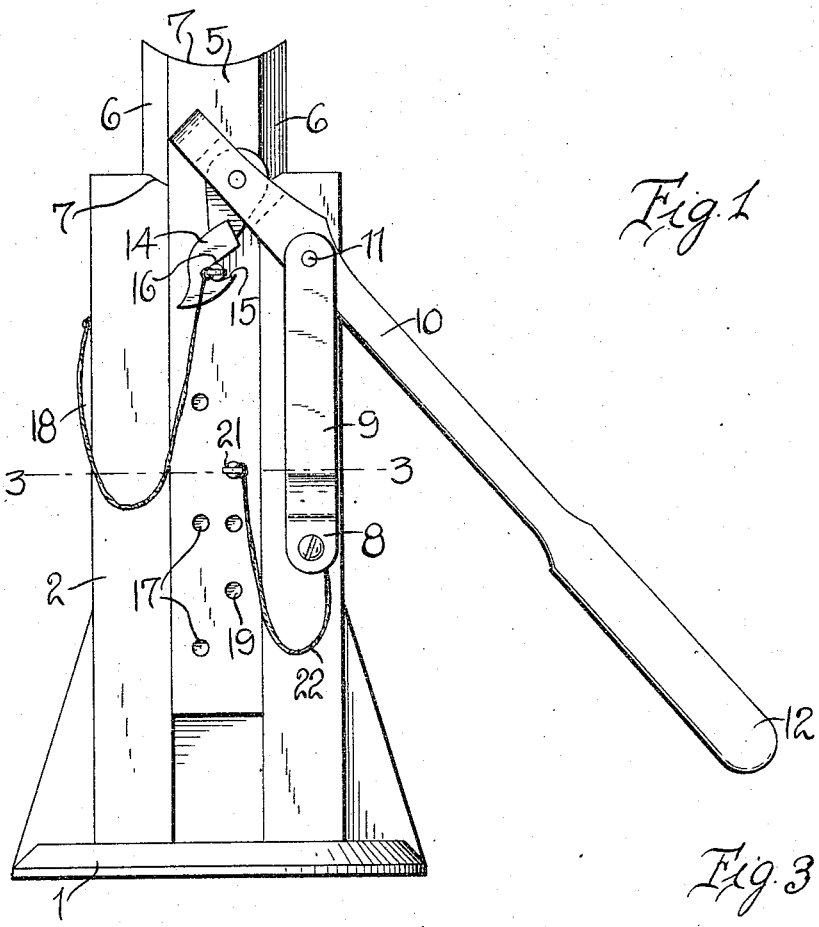
Figure 3:
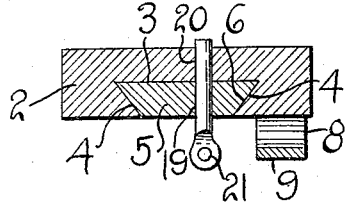
Figure 2:
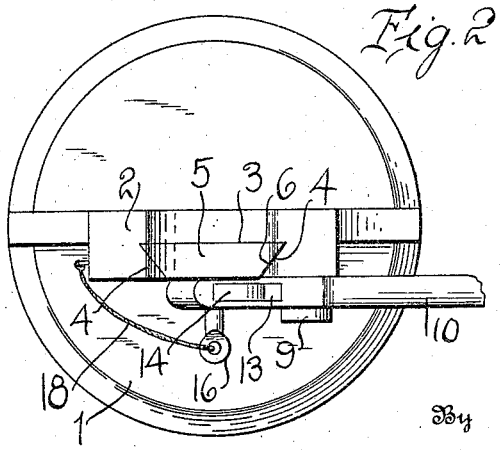

For a full understanding of the invention, reference is to be had to the following description and accompanying drawing, in which, Figure 1 is a side elevation of a jack embodying the improvements of my invention. Fig. 2 is a top plan view thereof. Fig. 3 is a horizontal section on the line 3—3 of Fig. 1.

Corresponding and like parts are referred to in the following description and designated in all of the views in the accompanying drawing by like reference characters.

Referring to the drawing, the numeral 1 designates the base of my improved lifting jack, and 2 designates the standard thereof, these parts being preferably integrally connected and of any desired size, shape and construction, except as hereinafter noted.

The standard 2 is formed in one face with a longitudinally disposed groove 3, the side walls of which are undercut, as at 4, and said groove is designed to receive and accommodate the lifting bar 5, the side edges of which are beveled, as at 6, to engage the undercut side walls 4 of the groove, whereby the bar 5 is mounted for free sliding movement within the groove. Preferably, there are two or more of the slide bars employed, of varying lengths, whereby they may be interchanged, according to the diameter of the wheel of the vehicle with which the device is designed for use, or according to the height it is desired to raise the axle, and the upper edge of the standard 2 and upper edge of the lifting bar 5 are preferably hollowed out or concave as indicated at 7, to properly support the axle or other part with which the device is engaged.

A bracket 8 is secured to one face of the standard 2 at one side of the groove 3, said bracket being longitudinally disposed, as shown, and formed with an offset portion 9 designed to accommodate a lever 10, which is fulcrumed intermediate of its ends on a pin or rod 11 which not only serves to support the lever, but has a connection between the upper end of the bracket 8 and the standard 2. The lever 10 is formed at one end with a handle 12 and at its other end with a slot 13 extending therethrough, and a lifting link 14 is pivotally mounted at one end within the slot 13, said link being formed at its relatively free end with a recess 15 designed for engagement with a pin 16. The pin 16 is adapted to be inserted into any one of a series of openings 17 that are formed in the lifting bar 5, and it is preferably permanently secured to the standard by a cord, chain, or similar flexible member 18, whereby it will not be liable to become lost. The bar 5 is also formed with openings 19 arranged in a substantially vertical series to one side of the openings 17 and designed to register with an opening 20 formed in the standard 2, whereby when a pin 21 is inserted in any one of the openings 19, and the opening 20 with which it registers, the lifting bar will be held stationary at the desired elevation. Preferably the pin 21 is connected by a cord, chain, or the like 22, to the standard 2, similar to the manner in which the pin 16 is connected.

From the foregoing description in connection with the accompanying drawing, the operation of my improved lifting jack will be apparent. In the practical use of the device, the lifting link 14 is engaged with the pin 16 after the latter has been inserted in one of the openings 17 as, for example, the opening at the uppermost end of the series, and by pressing down upon the handle end of the lever 10 it is obvious that the lifting bar 5 will be moved upwardly a distance sufficient to permit the pin 21 to be inserted through one of the openings 19 and the opening 20 in the standard 2. By thus repeating the operation and shifting the pins 16 and 21 from one of the openings 17 to a lower opening in the series and from one of the openings 20 to a lower opening in that series, respectively, it is obvious that by repeated steps the lifting bar may be raised to the required height and held there.

It will thus be seen that I have provided a very simple, durable and efficient construction of lifting jack which may be easily manipulated, and which will be found very useful particularly in connection with automobiles and other vehicles, and which may be very cheaply manufactured, as most of the parts may be made of castings and formed relatively light, without detracting from their strength.

While the accompanying drawing illustrates what I believe to be the preferred embodiment of my invention, it is to be understood that the invention is not limited thereto, but that various changes may be made in the construction, arrangements and proportions of the parts without departing from the scope of the invention as defined in the appended claim.

What is claimed, is:—

A lifting jack, comprising a base, a standard mounted thereon and formed in one face with a longitudinally disposed groove having undercut side walls, a lifting bar movably mounted in said groove and having beveled side edges engaging said walls; the standard being formed with an opening back of the lifting bar and the bar being formed with two series of openings, one series being adapted to register with the opening in the standard, a bracket secured to the grooved face of the standard and extending longitudinally thereof to one side of the lifting bar, a hand lever fulcrumed intermediate of its ends in said bracket and between the same and the standard, the lever being formed in one end with a slot, a recessed link pivotally mounted at one end in said slot, and pins insertible in said openings, one of said pins being adapted to be engaged by said link, as and for the purpose set forth.

In testimony whereof I hereunto affix my signature in the presence of two witnesses.

HIRAM C. STANBRIDGE.

Witnesses:
 DANIEL T. DEVOLL,
 MARY B. SULLIVAN.

Copies of this patent may be obtained for five cents each, by addressing the "Commissioner of Patents Washington, D. C."